(12) United States Patent
Yang

(10) Patent No.: US 9,356,443 B2
(45) Date of Patent: May 31, 2016

(54) ESD CLAMP FOR MULTIPLE POWER RAILS

(75) Inventor: Tsung-Ju Yang, Taichung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 558 days.

(21) Appl. No.: 13/563,420

(22) Filed: Jul. 31, 2012

(65) Prior Publication Data

US 2014/0036397 A1 Feb. 6, 2014

(51) Int. Cl.
*H02H 9/04* (2006.01)

(52) U.S. Cl.
CPC ........................... *H02H 9/046* (2013.01)

(58) Field of Classification Search
USPC .............................. 361/56, 57, 111
See application file for complete search history.

(56) References Cited

U.S. PATENT DOCUMENTS

| | | | | |
|---|---|---|---|---|
| 5,946,177 A * | 8/1999 | Miller et al. | | 361/56 |
| 6,327,126 B1 * | 12/2001 | Miller et al. | | 361/56 |
| 6,903,913 B2 * | 6/2005 | Ker et al. | | 361/111 |
| 6,954,098 B2 * | 10/2005 | Hsu et al. | | 327/313 |
| 7,221,551 B2 * | 5/2007 | Chen | H01L 27/0266 | 361/111 |
| 7,304,827 B2 * | 12/2007 | Chen et al. | | 361/56 |
| 7,586,721 B2 * | 9/2009 | Wang | H01L 27/0262 | 361/111 |
| 9,048,840 B2 * | 6/2015 | Liu | H03K 17/74 | |
| 9,172,244 B1 * | 10/2015 | Ma | H01L 27/0266 | |
| 9,225,317 B1 * | 12/2015 | Wadhwa | H03K 19/00315 | |
| 2004/0195630 A1 * | 10/2004 | Whitfield | H01L 29/7322 | 257/362 |
| 2004/0251502 A1 * | 12/2004 | Reddy | H01L 27/0277 | 257/356 |
| 2006/0198069 A1 * | 9/2006 | Chuan et al. | | 361/56 |
| 2012/0212256 A1 * | 8/2012 | Nicholas | H03K 19/018521 | 326/80 |
| 2015/0363539 A1 * | 12/2015 | Di Sarro | H01L 27/0251 | 716/111 |

OTHER PUBLICATIONS

Maloney, T.J., et al., "Stacked PMOS Clamps for High Voltage Power Supply Protection," EOS/ESD Symposium, Sep. 28-30, 1999, pp. 70-77.

* cited by examiner

*Primary Examiner* — Thienvu Tran
*Assistant Examiner* — Angela Brooks
(74) *Attorney, Agent, or Firm* — Slater Matsil, LLP

(57) ABSTRACT

An Electrostatic Discharge (ESD) clamp includes first power rail, a second power rail separate from the first power rail, and an ESD discharging circuit including a plurality of cascaded MOS transistors coupled between the second power rail and an electrical ground. A bias circuit is configured to turn on the ESD discharging circuit in response to an ESD event on the second power rail, and to turn off the ESD discharging circuit during a normal operation of the ESD clamp.

18 Claims, 4 Drawing Sheets

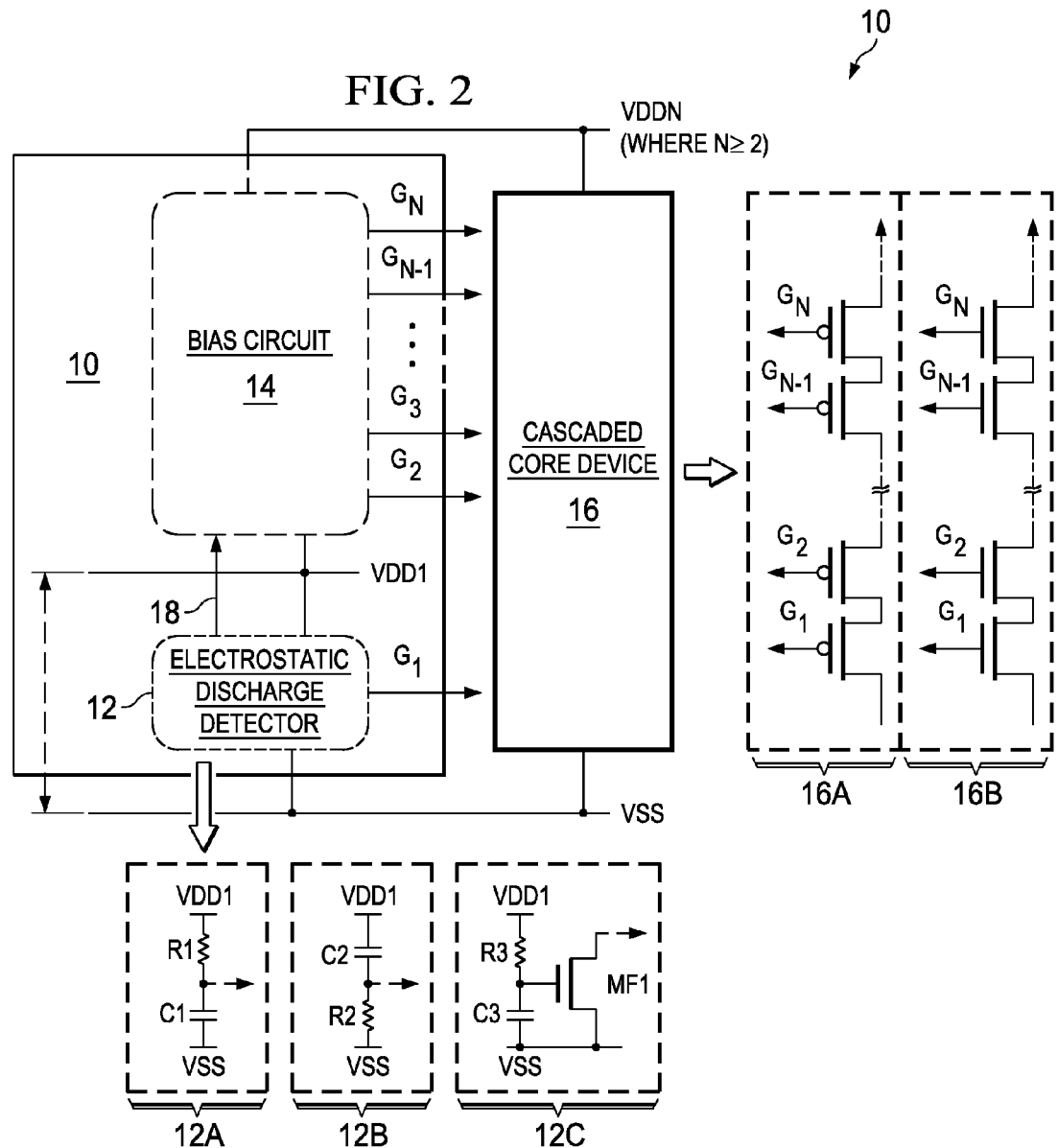

ESD CLAMP FOR MULTIPLE POWER RAILS

BACKGROUND

Electrostatic Discharge (ESD) is a known problem in the manufacturing and the using of integrated circuits. Typically, transistors have thin oxides and insulating layers that can be damaged by ESD events, and special care is required to protect the integrated circuits from the damage caused by the ESD events.

In integrated circuits, there are various types of devices, including logic devices, Input/output (IO) devices, high-voltage devices, and the like. Different types of devices may require different power supply voltages. In an application that includes different types of devices, accordingly, a plurality of power rails, with each carrying one of the power supply voltages, is needed. The power rails need to be protected by ESD clamps, which are used to discharge the ESD currents in response to the ESD transients.

Due to the use of multiple power supply voltages, the gate dielectrics of the MOS devices in the ESD clamps need to be able to endure the highest voltages that may be applied thereon without being broken down. Accordingly, the ESD clamps need to use thick gate oxides. The use of the thick oxides, however, results in the increase in the manufacturing cost sine there are other devices that need to use thin oxides. Although capacitors and diodes may also be used in the ESD clamps to avoid the use of dual gate oxides, the capacitors and the diodes, however, either require large chip areas or result in the degradation in the protection ability of the ESD clamps.

BRIEF DESCRIPTION OF THE DRAWINGS

For a more complete understanding of the embodiments, and the advantages thereof, reference is now made to the following descriptions taken in conjunction with the accompanying drawings, in which:

FIG. 2 illustrates some circuits for implementing the block diagram of the ESD clamp in FIG. 1;

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are illustrative, and do not limit the scope of the disclosure.

Electrostatic Discharge (ESD) clamps are provided in accordance with various exemplary embodiments. The variations and the operation of the embodiments are discussed. Throughout the various views and illustrative embodiments, like reference numbers are used to designate like elements. Throughout the description, the nodes that are connected to nodes marked with the same reference notations are interconnected, although the connecting line may not be shown. For example, all nodes connected to nodes Vcrl2 (FIGS. 3 and 4) are interconnected, all nodes connected to nodes Vcrl3 (FIGS. 3 and 4) are interconnected, and all nodes connected to nodes Vtri' are interconnected. Similarly, all power supply nodes VDD1 are interconnected, and all power supply nodes VDD2 are interconnected.

Figure 1:
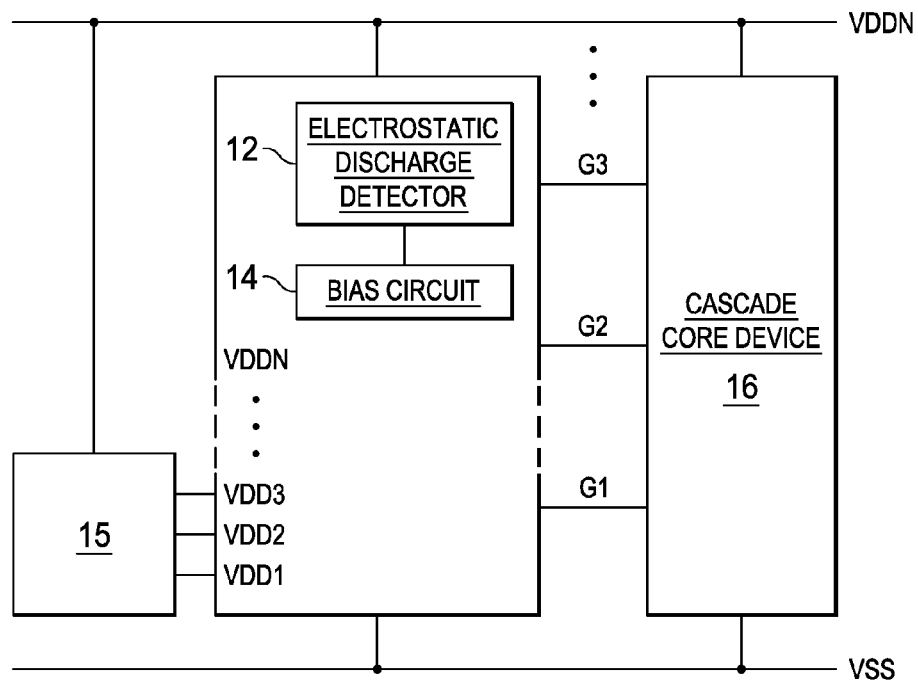
FIG. 1 illustrates a schematic block diagram of an Electrostatic Discharge (ESD) clamp in accordance with some exemplary embodiments.

FIG. 1 illustrates a schematic block diagram of ESD clamp 10 in accordance with embodiments. ESD clamp 10 includes ESD detector 12, bias circuit 14, and ESD discharging circuit 16. ESD clamp 10 is connected to a plurality of power rails, which are marked as VDD1, VDD2, VDD3 . . . and VDDN, wherein N represents any integer that is greater than 1. The power supply voltages on power rails VDD1, VDD2, VDD3 . . . and VDDN are also referred to as VDD1, VDD2, VDD3 . . . and VDDN, respectively. Power supply voltages VDD1, VDD2, VDD3 . . . and VDDN are generated by, and provided from, power source 15. Throughout the description, power supply voltage VDD2 is higher than power supply voltage VDD1, power supply voltage VDD3 is higher than power supply voltage VDD2, and so on. Power supply voltages VDD1, VDD2, VDD3 . . . VDDN may sometimes be referred to as 1×VDD, 2×VDD, 3×VDD . . . N×VDD, respectively, although the power supply voltages may not be exactly integer times VDD. For example, when VDD is 1 volt, 2×VDD may be 1.8 volts, and 3×VDD may be 2.5 volts.

ESD detector 12 is used to detect an ESD transient, and to start the action of ESD clamp 10 in response to an ESD transient. Bias circuit 14 is used to turn on ESD discharging circuit 16, so that the ESD current caused by the ESD transient may be discharged to electrical ground (VSS). Bias circuit 14 is also used to turn off ESD discharging circuit 16 during the normal operation of ESD clamp 10 (when no ESD transient occurs). ESD discharging circuit 16 may include a plurality of cascaded MOS transistors in some exemplary embodiments.

FIG. 2 schematically illustrates exemplary implementations of the block diagram in FIG. 1. In these embodiments, ESD detector 12 generates signal G1 to control a device in ESD discharging circuit 16, which device may be a PMOS transistor or an NMOS transistor. ESD detector 12 also generates detection signal 18, and feeds detection signal 18 to bias circuit 14, which then generates a plurality of signals G2, G3 . . . GN to control the MOS devices in ESD discharging circuit 16. On the right side of ESD discharging circuit 16 illustrate two possible implementations 16A and 16B of ESD discharging circuit 16. In implementation 16A, a plurality of PMOS devices are cascaded, with the gates of the PMOS devices coupled to, and receiving, signals G1, G2, G3 . . . GN. Accordingly, by applying logic high voltages as signals G1, G2, G3 . . . GN, ESD discharging circuit 16A is turned off. Conversely, by applying logic low voltages as signals G1, G2, G3 . . . GN, ESD discharging circuit 16A is turned on. In implementation 16B, a plurality of NMOS devices are cascaded, with the gates of the NMOS devices coupled to, and receiving, signals G1, G2, G3 . . . GN.

As also shown in FIG. 2, ESD detector 12 may be implemented using one of a plurality of available schemes, which are shown as implementations 12A, 12B, and 12C. For example, in implementation 12A, an RC ESD detector including resistor R1 and capacitor C1 is used, with capacitor C1 coupled between VSS and resistor R1. The middle point of resistor R1 and capacitor C1 is used as the output of the respective ESD detector 12A. In implementation 12B, a CR ESD detector including resistor R2 and capacitor C2 is used, with resistor R2 coupled between VSS and capacitor C2. The middle point of resistor R2 and capacitor C2 is used as the output of the respective ESD detector 12B. In implementation 12C, a float-gate ESD detector including resistor R3 and capacitor C3 is used, with capacitor C3 coupled between VSS and resistor R3. MOS device MF1 further includes a gate coupled to the interconnecting point of resistor R3 and capacitor C3, and a source coupled to VSS. The drain of MOS device MF1 is used as the output of the respective ESD detector 12C.

Figure 3:
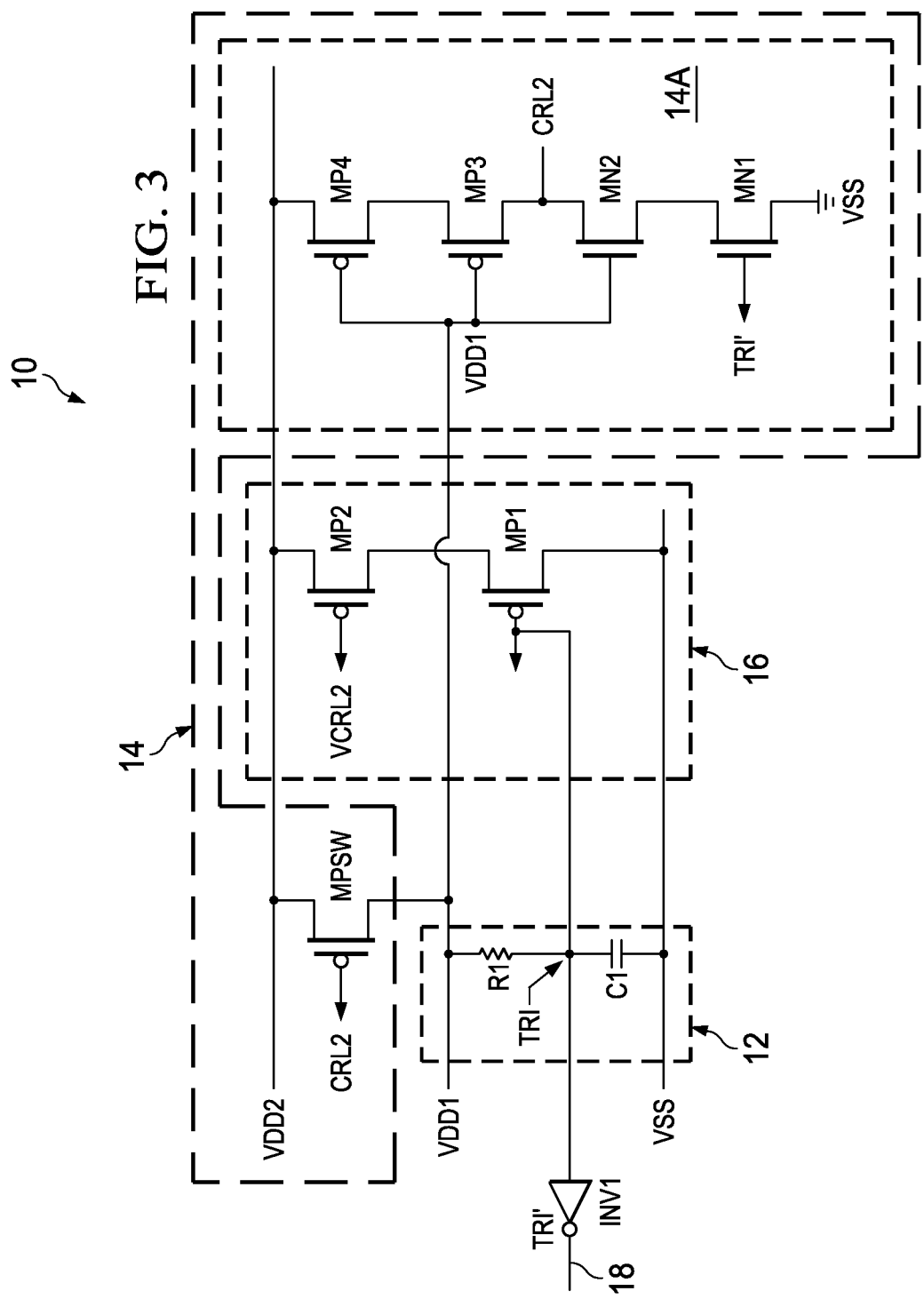
FIG. 3 illustrates an exemplary ESD clamp for the protection of the circuits that have two power rails.

FIG. 3 illustrates a circuit diagram of an exemplary ESD clamp 10, which implements the block diagrams in FIGS. 1 and 2. In the illustrated embodiments, two power rails VDD1 and VDD2 are included, which carry power supply voltages that are also referred to as VDD1 and VDD2, respectively. In some exemplar embodiments, power supply voltage VDD1 is 1 volt, and power supply voltage VDD2 is 1.8 volts. ESD detector 12 includes an RC circuit including resistor R1, which has one end coupled to power rail VDD1, and the other end coupled to capacitor C1. Capacitor C1 is coupled between resistor R1 and VSS.

ESD discharging circuit 16 includes PMOS transistors MP1 and MP2 cascaded between power rail VDD2 and VSS. Bias circuit 14 includes switch transistor MPsw coupled between power rails VDD1 and VDD2. Bias circuit 14 further includes NMOS transistors MN1 and MN2, which are cascaded with PMOS transistors MP3 and MP4. Transistors MN1, MN2, MP3, and MP4 form control signal generator 14A. The gates of transistors MN2, MP3, and MP4 are interconnected, and are connected to power rail VDD1. The drains of transistors MN2 and MP3 are connected to node Crl2, which is further connected to the gates of PMOS transistors MPsw and MP2. The gate of NMOS transistor MN1 is connected to the output node tri' of inverter INV1, which has an input connected to node tri (the connecting point of resistor R1 and capacitor C1). Node tri' carries detection signal 18.

During the normal operation of ESD clamp 10, wherein no ESD transient occurs, node tri is charged to VDD1. Transistor MP1 is thus turned off. Accordingly, ESD discharging circuit 16 is turned off, and no current flows between power rail VDD2 and VSS. Voltage Vtri' at the output node tri' is at logic low, such as VSS. Transistor MN1 is turned off. The gates of PMOS transistors MP3 and MP4 are at VDD1 (for example, 1V). The source of transistors MP4 is at VDD2 (for example, 1.8V). Accordingly, transistor MP4 is turned on, and transistor MP3 is accordingly turned on. The control voltage Vcrl2 at node crl2 is thus VDD2. Control voltage Vcrl2 is also the gate voltage of PMOS transistors MP2, which is accordingly turned off. Therefore, during the normal operation, ESD discharging circuit 16 is turned off. Switch transistor MPsw is also turned off by control voltage Vcrl2.

During an ESD event, for example, when ESD clamp 10 and the circuit that it protects are powered up, an ESD zapping voltage Vzap may be applied on power rail VDD2, wherein ESD zapping voltage Vzap may be higher than 1.5 V, higher than about 5V, or even higher. The ESD zapping voltage Vzap then passes through transistor MPsw, and is applied on power rail VDD1. Since the ESD event is a very quick signal, the RC delay of resistor R1 and capacitor C1 is significant, and hence voltage Vtri on node Vtri is still at voltage VSS. Transistor MP1 is thus turned on. The output of inverter INV1 has ESD zapping voltage Vzap since inverter INV1 uses power rail VDD1 as the power source. Accordingly, the voltage Vzap, which is likely greater than 1.5 volt or higher, is passed to the gate of transistor MN1, and hence transistor MN1 is turned on.

Through power rail VDD1, the gates of transistors MP3 and MP4 receive ESD zapping voltage Vzap. The source of transistors MP4 is also at Vzap. Accordingly, transistors MP3 and MP4 are turned off. Transistor MN2 is turned on, control voltage Vcrl2 is thus at VSS. This in turn causes PMOS transistor MP2 to be turned on. Since PMOS transistors MP1 and MP2 are both on, ESD discharging circuit 16 is turned on to discharge the ESD current from power rail VDD2 to VSS.

Figure 4:
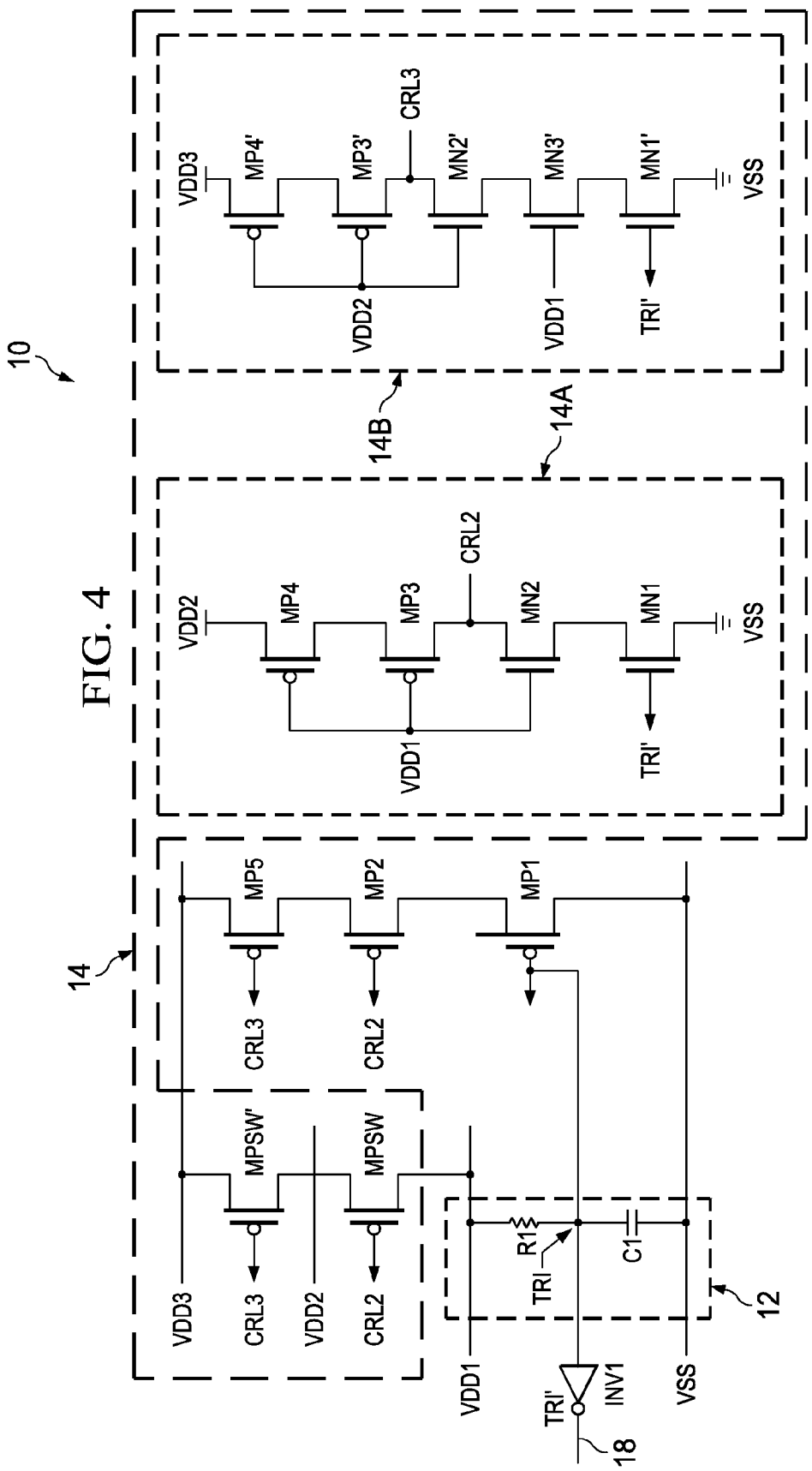
FIG. 4 illustrates an exemplary ESD clamp for the protection of circuits that have three power rails.

The bias circuit 14 in accordance with embodiments may be expanded to be used on circuits including more power rails such as VDD3, VDD4, or the like. For example, FIG. 4 illustrates an exemplary ESD clamp 10, which further includes power rail VDD3 at power supply voltage VDD3 (for example, about 2.5V). Compared to the bias circuit 14 in FIG. 3, an additional switch transistor MPsw' is added to couple power rail VDD3 to power rail VDD2, which is then coupled to power rail VDD1 through switch transistor MPsw. PMOS device MP5 is also added, and is cascaded with transistors MP1 and MP2.

The bias circuit 14 shown in FIG. 4 includes control signal generator 14A for generating voltage Vcrl2, wherein control signal generator 14A may be the same as in FIG. 3. Control signal generator 14B is further added to generate control signal Vcrl3, which is used to control PMOS device MP5 that is cascaded with transistors MP1 and MP2, and to control switch transistor MPsw'.

Control signal generator 14B comprises similar portions as in control signal generator 14A, except that the gates of transistors MN2', MP3', and MP4' are connected to power rail VDD2. NMOS transistor MN3 is added to cascade with transistors MN1', MN2', MP3', and MP4'. The gate of NMOS transistor MN3 is connected to power rail VDD1. The operation of the circuit in FIG. 4 may be derived from the teaching regarding FIG. 3. The same concept as shown in FIG. 4 may be expanded to form bias circuit 14 when more power rails are added, for example, if power rail VDD4 (not shown) is added.

Referring back to FIG. 3, it is observed that transistor MN2 shares the high voltage VDD2 with transitory MN1. Accordingly, both transistors MN1 and MN2 may use thin oxides, and can be formed simultaneously as core devices. The manufacturing of transistors MN1 and MN2 hence do not have to use separate processes other than the core device manufacturing processes. All PMOS transistors also operate with the respective drain-to-gate and source-to-gate voltages below voltage VDD1. Accordingly, all transistors in bias circuit 14 may use thin oxides.

The bias circuit 14 in accordance with embodiments uses MOS devices rather than passive devices such as capacitors, and does not use diodes. High-k gate dielectrics, FinFET structures, and the like, hence may be used to form the MOS devices in bias circuit 14. With the use of active devices rather than passive devices/diodes, the ESD discharging circuit 16 may be fully turned on in a short period of time since the gates of the transistors in ESD discharging circuit 16 are set to VSS quickly. The ESD discharging capability of ESD clamp 10 is thus high. The MOS devices occupy small chip areas, and hence the chip area occupancy of ESD clamp 14 is low.

Figure 5:
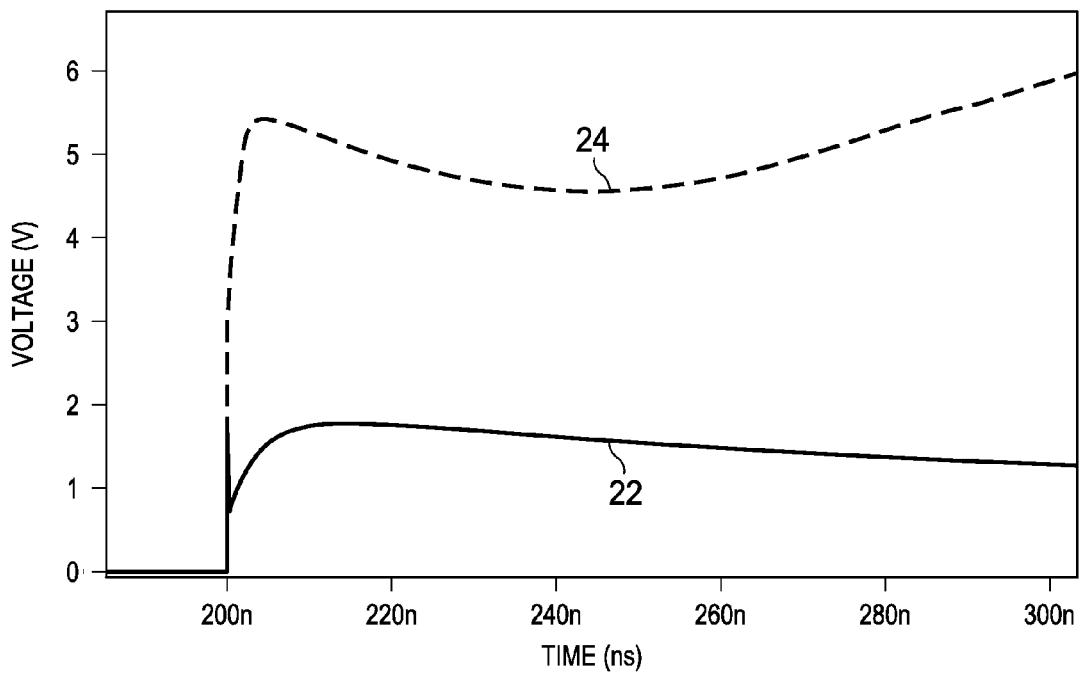
FIG. 5 illustrates simulation results, in which the voltage response of an ESD clamp in accordance with embodiments is compared to the voltage response of an ESD clamp comprising a capacitor.

FIG. 5 illustrates the simulation results, which show the ESD voltage (in human body mode) on power rail VDD3 (FIG. 4) as a function of time during an ESD event. Line 22 is simulated from the embodiment in FIG. 4, and line 24 is simulated from a conventional ESD clamp (not shown) using capacitors in the respective bias circuit. Line 22 shows that the ESD transient is clamped at about 1.8 volts in accordance with embodiments. As a comparison, as shown by line 24 in the conventional ESD clamp that uses capacitors, the ESD transient is clamped at about 5.8 volts, which indicates that the respective ESD clamp reacts much slower than in the embodiments.

In accordance with embodiments, an ESD clamp includes first power rail, a second power rail separate from the first power rail, and an ESD discharging circuit including a plurality of cascaded MOS transistors coupled between the second power rail and an electrical ground. A bias circuit is configured to turn on the ESD discharging circuit in response to an ESD event on the second power rail, and to turn off the ESD discharging circuit during a normal operation of the ESD clamp.

In accordance with other embodiments, an ESD clamp includes a first power rail, a second power rail separated from the first power rail, an ESD discharging circuit including a plurality of cascaded MOS transistors cascaded from the second power rail to an electrical ground, and a bias circuit coupled to the ESD discharging circuit. The bias circuit includes a first NMOS transistor including a first source coupled to VSS, a second NMOS transistor including a source connected to the drain of the first NMOS, a first PMOS transistor including a drain connected to a drain of the second NMOS, and a second PMOS transistor including a drain connected to a source of the first PMOS transistor, and a source connected to the second power rail. The gates of the second NMOS transistor, the first PMOS transistor, and the second PMOS transistor are further connected to the first power rail.

In accordance with yet other embodiments, a method includes, in response to an ESD event on a second power rail, conducting an ESD voltage from the second power rail to a first power rail, wherein the second power rail carries a second power supply voltage higher than a first power supply voltage on the first power rail. The ESD voltage on the first power rail is detected to generate a detection signal. The detection signal is used to turn on a first MOS transistor in an ESD discharging circuit, wherein the ESD discharging circuit includes a plurality MOS transistors cascaded between the second power rail and an electrical ground. The detection signal and the ESD voltage on the first power rail are used to generate a control signal. The control signal is used to turn on a second MOS transistor in the ESD discharging circuit, wherein the first and the second MOS transistors are cascaded.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An Electrostatic Discharge (ESD) clamp comprising:
   a first power rail;
   a second power rail separate from the first power rail;
   a first switch transistor coupling the first power rail to the second power rail;
   an ESD discharging circuit comprising a plurality of cascaded MOS transistors coupled between the second power rail and an electrical ground; and
   a bias circuit configured to turn on the ESD discharging circuit in response to an ESD event on the second power rail, and to turn off the ESD discharging circuit during a normal operation of the ESD clamp, the bias circuit comprising a first control signal generator, wherein the first control signal generator comprises:
   a first and a second NMOS transistor; and
   a first and a second PMOS transistor cascaded with the first and the second NMOS transistors, wherein gates of the second NMOS transistor and the first and the second PMOS transistors are connected to the first power rail.

2. The ESD clamp of claim 1,
   wherein the first control signal generator is configured to turn on the first switch transistor and one of the plurality of cascaded MOS transistors during the ESD event, and to turn off the first switch transistor and the one of the plurality of cascaded MOS transistors during the normal operation of the ESD clamp.

3. The ESD clamp of claim 2 further comprising:
   a third power rail separated from the first and the second power rails;
   a second switch transistor coupling the second power rail to the third power rail; and
   a second control signal generator, wherein the second control signal generator is configured to turn on the second switch transistor and an additional one of the plurality of cascaded MOS transistors during the ESD event, and to turn off the second switch transistor and the additional one of the plurality of cascaded MOS transistors during the normal operation.

4. The ESD clamp of claim 1, wherein a gate of the first NMOS transistor is configured to receive an output signal from an ESD detector.

5. The ESD clamp of claim 4, wherein the ESD detector comprises a resistor and a capacitor coupled in series between the first power rail and the electrical ground.

6. The ESD clamp of claim 1, wherein the plurality of cascaded MOS transistors in the ESD discharging circuit comprises PMOS transistors.

7. The ESD clamp of claim 1, wherein the first and the second power rails are coupled to a first output and a second output, respectively, of a voltage source, wherein the voltage source is configured to output a first power supply voltage to the first power rail, and a second power supply voltage to the second power rail, and wherein the second power supply voltage is higher than the first power supply voltage.

8. A Electrostatic Discharge (ESD) clamp comprising:
   a first power rail;
   a second power rail separated from the first power rail;
   an ESD discharging circuit comprising a plurality of cascaded MOS transistors cascaded from the second power rail to an electrical ground (VSS); and
   a bias circuit coupled to the ESD discharging circuit, wherein the bias circuit comprises:
   a first NMOS transistor comprising a first source coupled to VSS; and
   a second NMOS transistor comprising a source connected to a drain of the first NMOS transistor;
   a first PMOS transistor comprising a drain connected to a drain of the second NMOS transistor; and a second PMOS transistor comprising a drain connected to a source of the first PMOS transistor, and a source connected to the second power rail, wherein gates of the second NMOS transistor, the first PMOS transistor, and the second PMOS transistor are further connected to the first power rail.

9. The ESD clamp of claim 8 further comprising:
an ESD detector configured to detect an ESD transient on the first power rail; and
an inverter comprising an input coupled to an output of the ESD detector, and an output coupled to a gate of the first NMOS transistor.

10. The ESD clamp of claim 9, wherein the ESD detector comprises:
a capacitor comprising a first end coupled to the VSS; and
a resistor coupling a second end of the capacitor to the first power rail, wherein the input of the inverter is coupled to the second end of the capacitor.

11. The ESD clamp of claim 8 further comprising a switch transistor comprising a first source/drain coupled to second power rail, and a second source/drain coupled to the first power rail.

12. The ESD clamp of claim 11, wherein a gate of the switch transistor is coupled to a drain of the first PMOS transistor.

13. The ESD clamp of claim 8, wherein a drain of the first PMOS transistor is coupled to a gate of one of the plurality of cascaded MOS transistors.

14. The ESD clamp of claim 8, wherein the plurality of cascaded MOS transistors comprises PMOS transistors.

15. A method comprising:
in response to an Electrostatic Discharge (ESD) event on a second power rail, conducting an ESD voltage from the second power rail to a first power rail through a switch transistor, wherein the second power rail carries a second power supply voltage higher than a first power supply voltage on the first power rail;
detecting the ESD voltage on the first power rail to generate a detection signal, wherein the detection signal is a logic low signal;
using the detection signal to turn on a first MOS transistor in an ESD discharging circuit, wherein the ESD discharging circuit comprises a plurality of MOS transistors cascaded between the second power rail and an electrical ground, wherein each of the plurality of MOS transistors is a PMOS transistor;
using the detection signal and the ESD voltage on the first power rail to generate a control signal; and
using the control signal to turn on a second MOS transistor in the ESD discharging circuit, wherein the first and the second MOS transistors are cascaded.

16. The method of claim 15, further comprising providing the control signal back to a gate of the switch transistor to keep the switch transistor turned on during the ESD event.

17. The method of claim 16 further comprising, in response to non-ESD events, generating an additional control signal to turn off the switch transistor.

18. The method of claim 17 further comprising, in response to the non-ESD events, using the additional control signal to turn off the ESD discharging circuit.

* * * * *